UNITED STATES PATENT OFFICE.

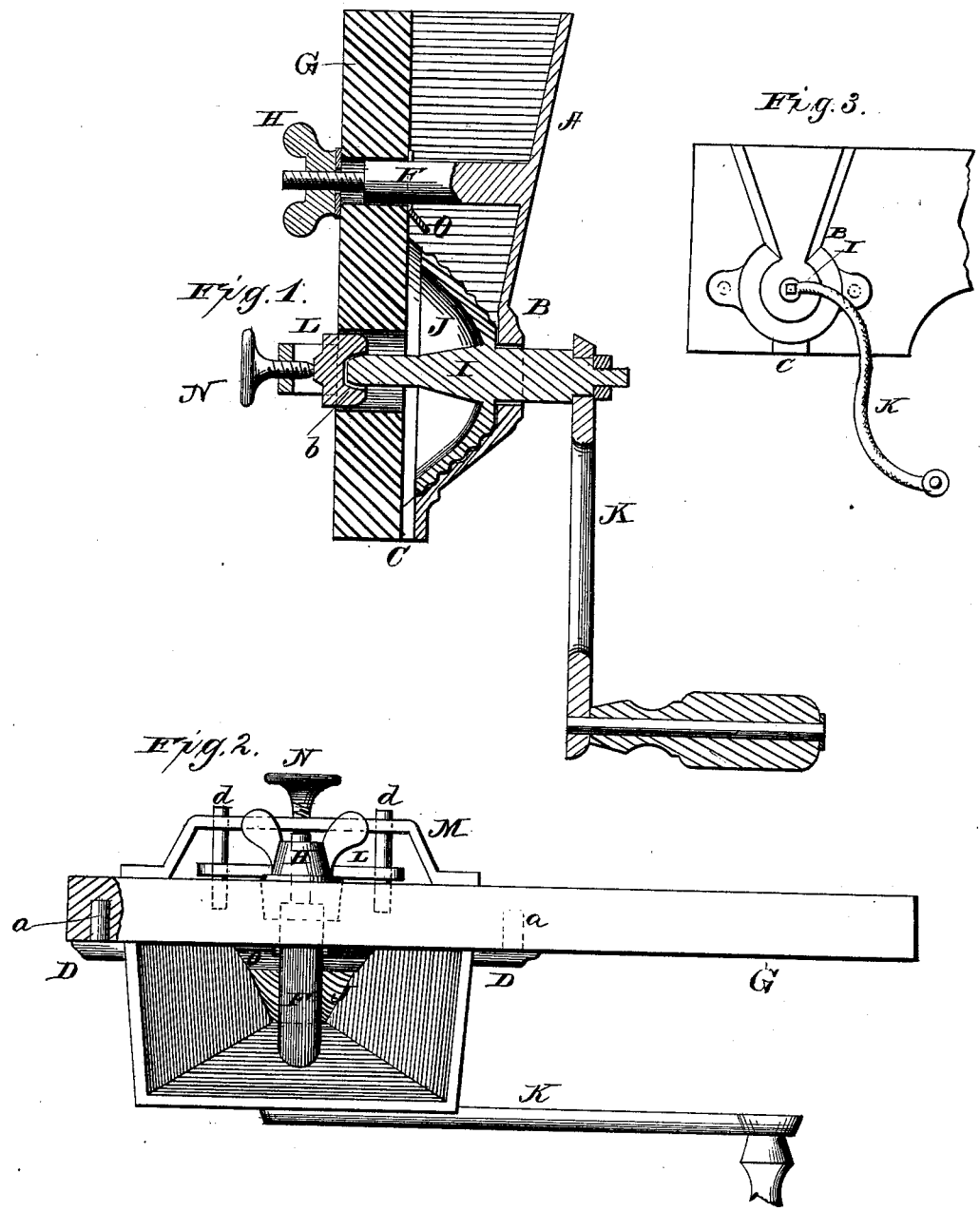

HENRY MATKIN, OF CRESCENT CITY, ILLINOIS.

IMPROVEMENT IN COFFEE-MILLS.

Specification forming part of Letters Patent No. 214,429, dated April 15, 1879; application filed January 14, 1879.

*To all whom it may concern:*

Be it known that I, HENRY MATKIN, of Crescent City, in the county of Iroquois, and in the State of Illinois, have invented certain new and useful Improvements in Coffee-Mills; and do hereby declare that the following is a full, clear, and exact description thereof, reference being had to the accompanying drawings, and to the letters of reference marked thereon, making a part of this specification.

The nature of my invention consists in the construction and arrangement of a coffee and spice mill, as will be hereinafter more fully set forth.

In order to enable others skilled in the art to which my invention appertains to make and use the same, I will now proceed to describe its construction and operation, referring to the annexed drawings, in which—

Figure 1 is a transverse vertical section of my improved coffee and spice mill. Fig. 2 is a plan view of the same. Fig. 3 is a front view thereof in reduced dimensions.

A represents the hopper of the mill, leading into the conical grinding-chamber B, at the bottom of which is the spout or outlet C.

At each side of the grinding-chamber B is a wing or ear, D, having a pin, $a$, extending rearward from the same. From the inside of the hopper projects a bolt, F, having screw-threads cut on its extreme end, as shown.

The hopper, grinding-chamber, outlet, wings with pins, and bolt, are all cast in one single piece, leaving the back entirely open, and then fastened to a board or back, G. This back has a hole through it for the passage of the bolt F, and two recesses for the insertion of the pins $a\ a$.

A thumb-nut, H, is screwed on the end of the bolt F, whereby the mill is held firmly to the board, the pins $a$ preventing a "wabbling" thereof.

By unscrewing the thumb-nut H the mill is easily and quickly removed from the board for the purpose of cleaning, which is very essential when changing from one article to another to be ground.

J represents the grinding-cone, made hollow, and cast on a shaft, I. The front end of this shaft passes through a central hole in the grinding-chamber B, and has a crank, K, secured upon its projecting end for rotating the same.

The inner or rear end of the shaft I rests in a socket or hub, $b$, formed on a plate, L, arranged on the back of the board G, and having the hub projecting into an aperture in the board. The plate L is, at each end, provided with a pin, $d$, projecting on both sides thereof, as shown.

One end of each pin projects into a hole or recess in the back of the board, and the outer end of the pin passes through a hole in a yoke, M, which is firmly fastened to the board. Through the center of the yoke M is passed a set-screw, N, to bear against the center of the plate L, and by means of which the grinding-cone J is regulated with relation to the grinding-surface of the chamber B to grind coarse or fine, as desired. When it has been adjusted it will under no circumstances change accidentally, as there can be no friction on the screw N to cause the same to turn.

The plate L is guided by the pins $d$, so as to be retained at all times in the proper plane. On the inside surface of the board G is attached a metallic shield or apron, O, in the lower part of the hopper, for the purpose of keeping the coffee or spices from going between the back of the mill and the grinding-cone before being ground.

Having thus fully described my invention, what I claim as new, and desire to secure by Letters Patent, is—

In a coffee or spice mill, the body A B C, provided with a single bolt, F, in combination with the board G and a single thumb-nut, H, for securing the mill to the board, substantially as herein set forth.

In testimony that I claim the foregoing I have hereunto set my hand this 4th day of December, 1878.

HENRY MATKIN.

Witnesses:
 ELISHA FERGUSON,
 S. G. STAPLES.